United States Patent
Herrmann et al.

(10) Patent No.: US 7,126,936 B2
(45) Date of Patent: Oct. 24, 2006

(54) WIRELESS NETWORK FOR TRANSMITTING PARAMETERS FOR AN ENCODED DATA TRANSMISSION

(75) Inventors: Christoph Herrmann, Aachen (DE); Patrick Nickel, Merkstein (DE)

(73) Assignee: Koninklijke Philips Electronics, N.V., Eindhoven (NL)

( * ) Notice: Subject to any disclaimer, the term of this patent is extended or adjusted under 35 U.S.C. 154(b) by 892 days.

(21) Appl. No.: 10/003,053

(22) Filed: Nov. 2, 2001

(65) Prior Publication Data

US 2004/0004947 A1 Jan. 8, 2004

(30) Foreign Application Priority Data

Nov. 14, 2000 (DE) ................. 100 56 361

(51) Int. Cl.
*H04J 3/06* (2006.01)
*H04K 1/00* (2006.01)
(52) U.S. Cl. ............... 370/350; 370/503; 380/270
(58) Field of Classification Search ........... 370/328, 370/350, 503; 714/746; 380/270
See application file for complete search history.

(56) References Cited

U.S. PATENT DOCUMENTS

2001/0046240 A1 * 11/2001 Longoni et al. ............ 370/503

FOREIGN PATENT DOCUMENTS

WO     WO 00/28744    * 5/2000

* cited by examiner

*Primary Examiner*—Kevin C. Harper
(74) *Attorney, Agent, or Firm*—Aaron Waxler; Paul Im

(57) ABSTRACT

The invention relates to a wireless network comprising a radio access network and a plurality of terminals which are each provided for encoding certain data to be transmitted and for forming a key in the same manner in dependence on a first and a second frame number for a connection to be set up or to be reconfigured between the radio access network and a terminal. The first frame number depends on the periodically changing number of the radio frame used for the data transmission and the value of the second frame number depends on the first frame number. Based on the value of the first frame number the terminal and/or the radio access network is provided for ascertaining whether a time delay is to take place in the formation of the second frame number in the radio access network.

6 Claims, 3 Drawing Sheets

WIRELESS NETWORK FOR TRANSMITTING PARAMETERS FOR AN ENCODED DATA TRANSMISSION

The invention relates to a wireless network comprising a radio access network and a plurality of terminals which are each provided for encoding certain data to be transmitted and for forming in the same manner A KEY in dependence on a first and a second frame number for a connection to be set up or reconfigured between the radio access network and a terminal.

Such a wireless network is known from the $3^{rd}$ Generation Partnership Project (3GPP); Technical Specification Group (TSG) RAN; Working Group 2 (WG2); Radio Interface Protocol Architecture; TS 25.331 V.3.4.1, chapter 8.5.17. For encoding data which are transmitted between the radio access network and a terminal, keys are necessary which, in the transparent mode, are formed from various frame numbers. A frame number, which is denoted connection frame number, is calculated according to a formula and uses a radio or system frame number. This connection frame number is used for incrementing the hyperframe number. It may happen then that the radio access network and the assigned terminal change their hyperframe numbers in a different manner, which leads to differing decoding masks.

It is an object of the invention to provide a wireless network in which a change of the same kind of the hyperframe number is made possible both in the radio access network and in the terminal.

The object is achieved by a wireless network that has the following characteristic features:

The wireless network comprises a radio access network and a plurality of terminals which are each provided for encoding certain data to be transmitted and for forming in the same manner a key in dependence on a first and a second frame number for a connection to be set up or reconfigured between the radio access network and a terminal, in which the first frame number depends on the periodically changing number of the radio frame used for the data transmission and the value of the second frame number depends on the first frame number, and in which the terminal and/or the radio access network is provided for ascertaining, based on the value of the first frame number, whether a time delay in the formation of the second frame number is to take place in the radio access network.

Figure 1:
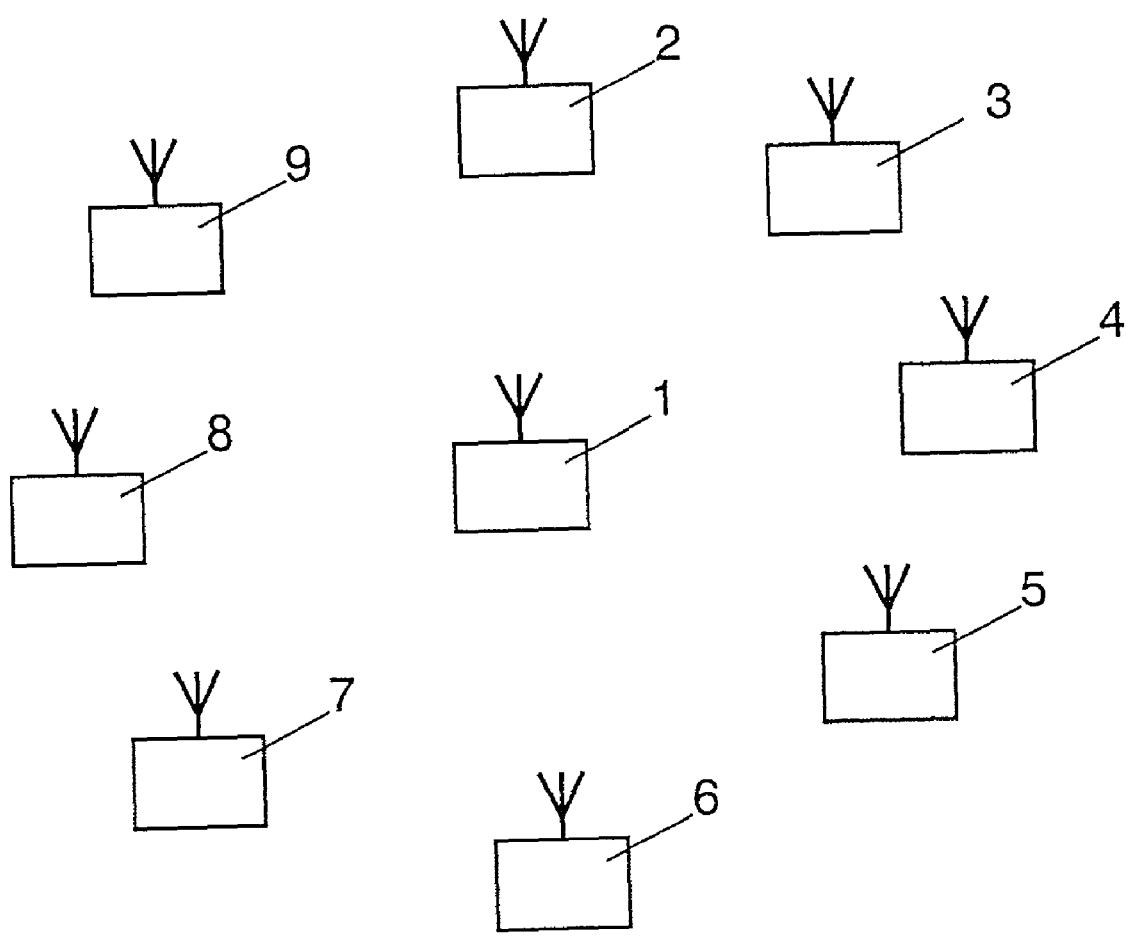
Figure 2:
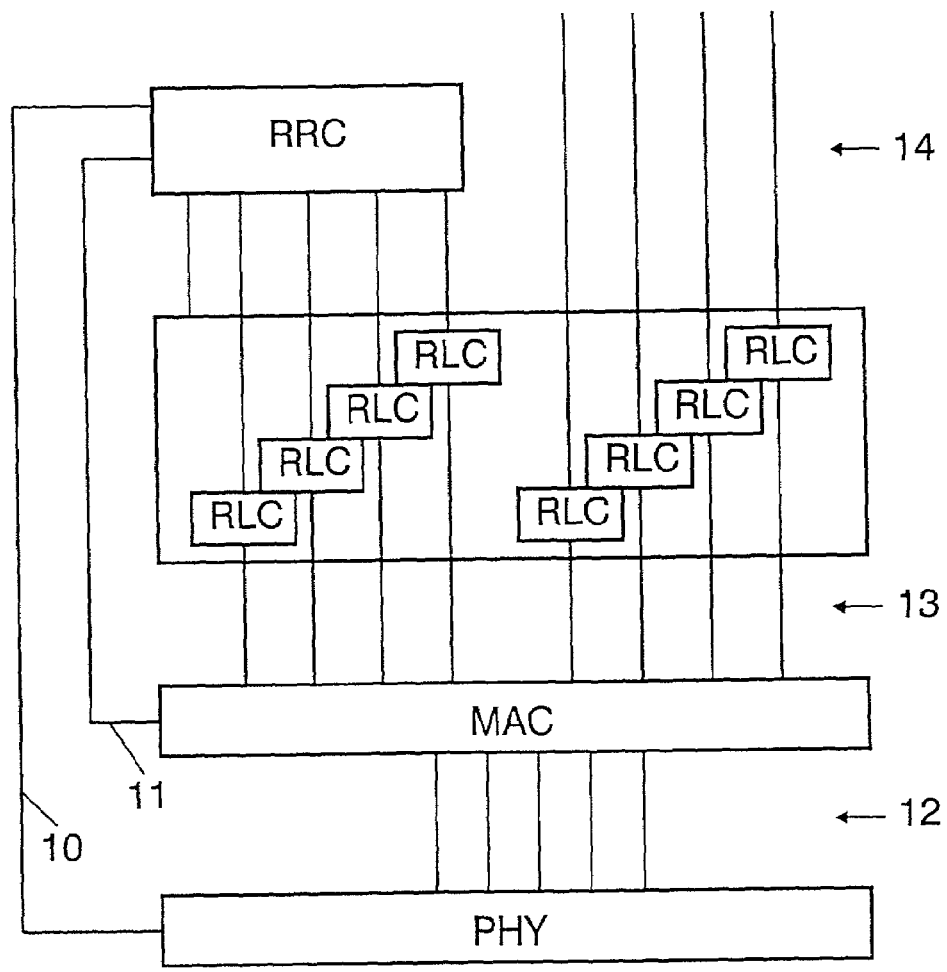
Figure 3:
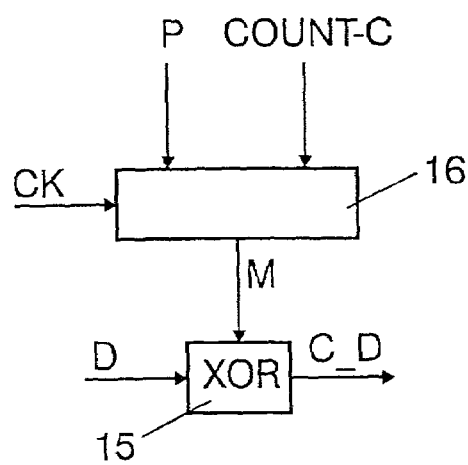
Figure 4:
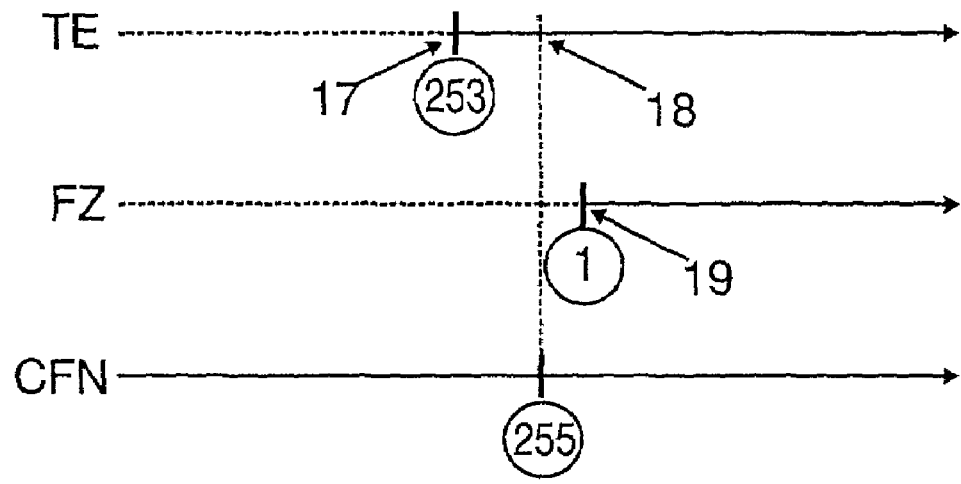
Figure 5:
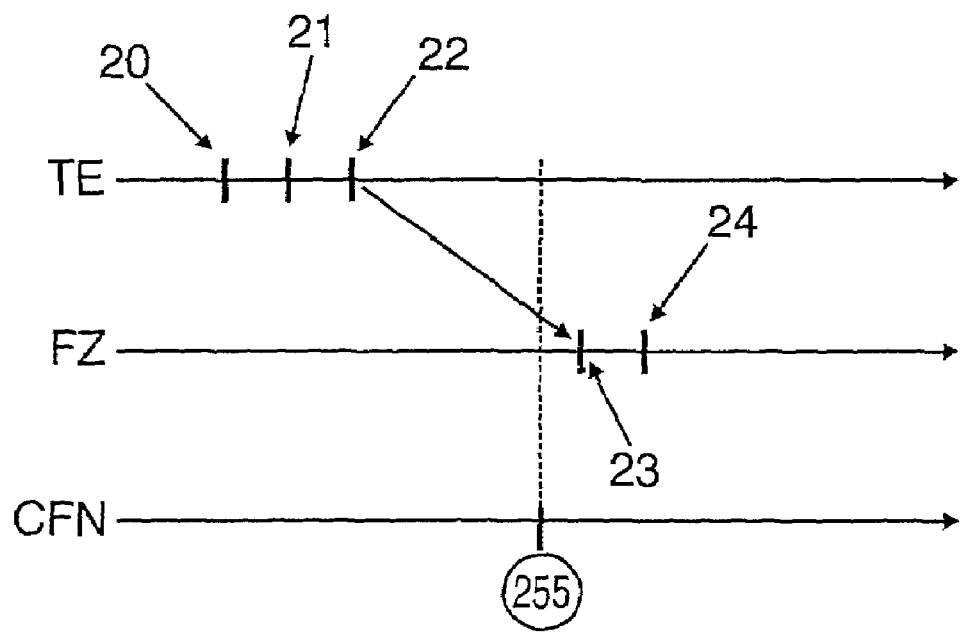

Examples of embodiment of the invention will be further explained hereinbelow with reference to the Figures, in which:

FIG. 1 shows a wireless network comprising a radio access network and a plurality of terminals, FIG. 2 shows a layer model for explaining various functions of a terminal or of a radio access network, FIG. 3 shows a block diagram for explaining the encoding mechanism in a terminal or in a radio access network, and FIGS. 4 and 5 show diagrams for explaining changes of a hyperframe number.

FIG. 1 shows a wireless network, for example, a radio network comprising a radio access network 1 which consists of a base station and a Radio Network Controller (RNC) and a plurality of terminals 2 to 9. The radio access network 1 generally comprises a plurality of base stations and a plurality of radio network controllers. The radio network controller (RNC) is responsible for the control of all the components that take part in the radio traffic (for example, terminals 2 to 9, base station). The base station transmits the control data and useful data to the terminals 2 to 9, which data are received from the radio network controller.

As a rule, the terminals 2 to 9 are mobile stations. A base station inside the radio access network 1 is usually fixedly installed, but may also be movable or mobile, as the case may be.

The network shown in FIG. 1 comprises one radio cell. Such a network, however, may also comprise a plurality of radio cells and the terminals may also change among the radio cells.

In the wireless network are transmitted, for example, radio signals in accordance with the FDMA, TDMA or CDMA method (FDMA=frequency division multiple access, TDMA=time division multiple access, CDMA=code division multiple access), or in accordance with a combination of the methods.

In accordance with the CDMA method, which is a special code spreading method, binary information (a data signal) originating from a user is modulated each time with a different code sequence. Such a code sequence includes a pseudo-random square-wave signal (pseudo-noise code) whose rate, also referred to as chip rate, is generally considerably higher than that of the binary information. The duration of a square-wave pulse of the pseudo-random square-wave signal is referred to as a chip interval $T_C$. $1/T_C$ is the chip rate. The multiplication or modulation, respectively, of the data signal by the pseudo-random square-wave signal results in a spreading of the spectrum by the spreading factor $N_C=T/T_C$, where T is the duration of a square-wave pulse of the data signal.

Useful data and control data are transmitted between at least one terminal (2 to 9) and the radio network controller of the radio access network 1 over channels predefined by the radio network controller. A channel is determined by a frequency range, a time range and, for example, in the CDMA method, by a spreading code. The radio link from the base station to the terminals 2 to 9 is referred to as a downlink and from the terminals to the base station as an uplink. Thus, data are transmitted from the base station to the terminals over downlink channels and from the terminals to the base station over uplink channels.

For example, a downlink control channel may be provided, which is used for broadcasting control data from a radio network controller 1 to all the terminals 2 to 9 prior to a connection set-up. Such a channel is referred to as a downlink broadcast control channel. For transmitting control data from a terminal 2 to 9 to a radio network controller 1 prior to a connection set-up, for example, an uplink control channel assigned by the radio network controller of the radio access network 1 can be used which, however, can also be accessed by other terminals 2 to 9. An uplink channel, that can be used by various or all terminals 2 to 9, is referred to as a common uplink channel. After setting up a connection, for example, between a terminal 2 to 9 and a radio network controller of the radio access network 1, useful data are transmitted over a downlink and an uplink user channel. Channels that are set up between only one transmitter and one receiver are referred to as dedicated channels. As a rule, a user channel is a dedicated channel which can be accompanied by a dedicated control channel for transmitting link-specific control data.

To include a terminal 2 to 9 in a radio network controller of the radio access network 1, a contention-prone channel having random access is responsible, which will be referred to as RACH channel (Random Access Channel) henceforth. Also data packets can be transmitted over such a RACH channel. A further contention-prone channel having random access, which is provided for the transmission of data from a terminal 2 to 9 to a radio network controller of the radio access network 1, is referred to as FACH channel (Forward Access Channel).

For exchanging useful data between the radio access network 1 and a terminal, it is necessary for a terminal 2 to 9 to be synchronized with a base station of the radio access network 1. For example, it is known from the GSM system (GSM=Global System for Mobile communications), in which a combination of FDMA and TDMA methods is used, that, after a suitable frequency range has been determined based on predefined parameters, the time-dependent position of a frame is determined (frame synchronization), which frame synchronization helps sequencing the data transmission. Such a frame is always necessary for the data synchronization of terminals and base station in the case of TDMA, FDMA and CDMA methods. Such a frame may contain various sub-frames or, together with several other successive frames, form a hyperframe. For simplicity, a frame which is referred to as a reference frame, is started from.

The exchange of control data and useful data via the radio interface between the radio access network 1 and the terminals 2 to 9 can be explained with reference to the layer model or protocol architecture shown in FIG. 2 (compare, for example, 3$^{rd}$ Generation Partnership Project (3GPP); Technical Specification Group (TSG) RAN; Working Group 2 (WG2); Radio Interface Protocol Architecture; TS 25.301, V3.6.0 (2000–09)). The layer model comprises three protocol layers: the physical layer PHY, the data link layer having the sub-layers MAC and RLC (in FIG. 2 various shapes of the sub-layer RLC are shown) and the layer RRC. The sub-layer MAC is responsible for Medium Access Control, the sub-layer RLC for Radio Link Control and the layer RRC for Radio Resource Control. The layer RRC is responsible for the signaling between the terminals 2 to 9 and a radio network controller of the radio access network 1. The sub-layer RLC is used for controlling a radio link between a terminal 2 to 9 and a radio network controller of the radio access network 1. The layer RRC controls the layers MAC and PHY via control links 10 and 11. Thus the layer RRC can control the configuration of the layers MAC and PHY. The physical layer PHY offers transport links 12 to the MAC layer. The MAC layer renders logic connections 13 available to the RLC layer. The RLC layer can be reached by applications via access points 14.

In such a wireless network, the data are transmitted via the radio interface in a coded form for reasons of security and confidentiality, to avoid being tapped in an unauthorized manner. The encoding is executed in the data link layer (for example, in the RLC or MAC layer). As shown in FIG. 3, the data D are combined with an encoding mask M via an Exclusive-OR function (XOR), so that an encoded data stream C_D is the result. The encoding mask M is formed in an encoding function 16, which works with an encoding algorithm and receives as input values the key CK, the count COUNT-C and other parameters P not further shown here. The count COUNT-C is 32 bits long. It is formed differently for different RLC types of link (RLC-acknowledged-mode transmission i.e. with a packet header and sequence number and repetition of transmission based thereon, RLC-unacknowledged-mode transmission i.e. with a packet header and sequence number, but without repetitions of transmission, RLC-transparent-mode transmission i.e. without a packet header and without a sequence number). For all the links in the RLC-transparent mode, the lower 7 bits of COUNT-C are determined by a connection frame number (CFN), which also consists of 7 bits and is determined from the system frame number (SFN) emitted by a base station over the broadcast or distribution channel. The system frame number SFN is incremented modulo-4096 after each change of frame. COUNT-C distinguishes itself here for links in the circuit-switching service and packet-switching service. All the links in the circuit-switching service use the same value COUNT-C. All the links in the packet-switching service also use the same value COUNT-C which, however, is different from the value COUNT-C in the circuit-switching service. For each individual link in the RLC-acknowledged-mode, the lower 12 bits of COUNT-C are determined by the 12-bit sequence number of the packet header; for each individual link in the RLC-unacknowledged-mode the lower 7 bits of COUNT-C are determined by the 7-bit sequence number of the packet header, so that the values of COUNT-C for different connections for which no RLC-transparent-mode transmission is chosen, generally differ from one another.

The remaining bits of COUNT-C, which are referred to as hyperframe number (AFN), are calculated from a 20-bit number START in accordance with the following instruction:

The terminal announces a stored 20-bit value START-CS and a 20-bit value START-PS to the radio network controller when the RRC link is set up for circuit-switching services (CS) and packet-switching services (PS). These values initialize the upper 20 bits of the hyperframe number HFN for links in the circuit-switching service and in the packet-switching service. Accordingly, when the RRC link is cleared, values START-CS and START-PS to be stored for the respective links in the circuit-switching service and packet-switching service are formed from the available hyperframe numbers HFN in that the maximum is calculated of all the available values COUNT-C.

The hyperframe number HFN is always incremented when in the case of RLC-transparent-mode transmission the connection frame number CFN has a wrap around, or the sequence number of the RLC-acknowledged-mode transmission or RLC-unacknowledged-mode transmission has a wrap around. As this usually happens both in the terminals and in the radio network controller, always the same values COUNT-C are used for the coding and the decoding of the individual links, so that the decoding can be effected correctly.

However, problems with respect to the equality of the hyperframe numbers HFN in the terminal and in the radio network controller may occur during the RLC-transparent-mode transmission when, after the RACH channel is used for uplink data and the FACH channel for downlink data, a dedicated channel is assigned to the terminals (change from one state to (CELL_FACH) in which the location of the terminal on a cell level is known and the terminal sends uplink data over the RACH channel and receives downlink data over the FACH channel, to a state (CELL_DCH) in which the terminal receives uplink and downlink data over a dedicated channel), or in the case where the non-synchronized hard handover changes to a new cell. A non-synchronized hard handover is understood to mean that when the terminal does not yet know the system frame number SFN in the new cell before the connection to the old cell is switched off (is non-synchronized), and the link to the new cell is not switched on until the link to the old cell is switched off (hard handover). In this situation it is indistinct on the side of the radio network controller whether the terminal has incremented the hyperframe number HFN, so that the hyperframe number HFN in the terminal may differ from that in the radio network controller.

The radio network controller shows a change from state CELL_FACH to the state CELL_DCH inter alia by sending a message PCR (Physical Channel Reconfiguration) (compare 3GPP TS 25.331 v3.4.1), which informs a terminal of the code it should use for receiving and transmitting on the dedicated channel. After the change from the state CELL_FACH to the state CELL_DCH, the terminal calculates the connection frame number CFM valid in the state CELL_DCH by means of the formula $$CFN=((SFN*38400-DOFF*512)div\ 38400)mod\ 256,$$

where SFN denotes the system frame number in the cell in which the terminal utilizes the dedicated channel and DOFF represents a terminal-specific number with which the radio network controller can broadcast with time the transmission instants of various terminals (compare 3GPP TS 25.331 v.3.4.1, chapter 8.5.17). DOFF is announced to the terminal in the message PCR.

At the change from the state CELL_FACH to the state CELL_DCH, it may happen that the terminal, after reaching synchronization with the physical downlink signal of the base station determined by the then current system frame number SFN, which is calculated according to the above formula, possibly determines a connection frame number CFN which is close to 255, for example 253. In FIG. 4 this is shown, in which TE refers to a terminal, FZ refers to the radio access network and CFN refers to the connection frame number. The reference character 17 indicates the connection frame number CFN calculated in the terminal, which equals 253, and the reference character 18 the maximum connection frame number CFN, which equals 255. After synchronization with the physical downlink signal of the base station has been reached, the terminal sends its uplink signal. If the radio network controller synchronizes with this physical uplink signal of the terminal, for example, only 4 radio frames after the synchronization with the physical downlink signal in the terminal, the radio network controller does not determine the connection frame number CFN from the system frame number SFN known on both sides until this instant, which connection frame number CFN, calculated according to the above formula, is the value 1 (compare FIG. 4 reference character 19). On the side of the terminal there has been a wrap around of the connection frame number CFN, which causes the hyperframe number HFN in the terminal to be incremented. In the radio network controller the connection frame number CFN has the value 1 after which the radio network controller has synchronized with the physical uplink signal (i.e. the connection frame number CFN has not had a wrap around), so that the hyperframe number HFN is not incremented. As a result, the hyperframe numbers HFN and thus the values COUNT-C in the terminal and the radio network controller are different, so that a decoding can no longer be made correctly.

An announcement of the radio network controller about an activation time (consisting of a connection frame number CFN) may provide help here for incrementing the hyperframe number HFN, at which time the hyperframe number HFN may actually be incremented. Since the radio network controller itself can determine the new connection frame number CFN beforehand, which number is used by the terminal after synchronization has been reached with the downlink signal of the base station, the radio network controller can estimate that a wrap around of the connection frame number CFN can be expected and set the activation time, for example, to the connection frame number CFN=20. It should then be taken into consideration how long the maximum duration is until the radio network controller has synchronized with the physical uplink signal, after which the terminal has synchronized with the physical downlink signal before that. Only after the synchronization with the physical uplink signal can the radio network controller be certain that also the terminal has synchronized with the physical downlink signal and has thus switched over to the new connection frame number CFN. The activation time for incrementing the hyperframe number HFN should be included in the message PCR or another message which can introduce the change from state CELL_FACH to state CELL_DCH.

Instead of the transmission of the activation time for incrementing the hyperframe number HFN, the radio network controller may also suitably delay the physical downlink signal.

When a terminal changes cells in case of an unsynchronized hard handover, the same problem arises, but here the radio network controller, when sending the message PCR (or another message that may introduce the hard handover), cannot yet know the system frame number SFN in the new cell (since this number is not determined by the terminal). Solving the problem of synchronization via an activation time is then impossible, because it is essential for the radio network controller to know when a wrap around will occur in the new cell when the valid connection frame number CFN is used. Since the system frame number SFN in the new cell of the radio network controller is not known to the old cell, with the known calculation formula the radio network controller of the old cell cannot indicate a suitable activation time for the connection frame number CFN in the new cell, since the system frame number SFN of the new cell is included.

With the unsynchronized hard handover and after the change to the new cell, the terminal calculates the connection frame number CFN valid there also by means of the formula $$CFN=((SFN*38400-DOFF*512)div\ 38400)mod\ 256,$$

where SFN denotes the system frame number in the new cell in which the terminal further utilizes the dedicated channel and DOFF again represents a terminal-specific number with which the radio network controller can broadcast with time the transmission instants of various terminals (compare 3GPP TS 25.331 V3.4.1, chapter 8.5.17). DOFF is announced to the terminal already in the message PCR.

A remedy to the development of different hyperframe numbers HFN in the terminal and in the radio network controller is provided by the two following measures (deactivation procedure):

With the first measure a minimum connection frame number CFN_min smaller than 256 is defined, which number lays down a deactivation interval between the minimum connection frame number CFN_min and 255, from which the terminal, after reaching the synchronization with the downlink signal, does not increment the hyperframe number HFN at the next wrap around of the connection frame number CFN and does not send the uplink signal with which the base station is synchronized until after this next wrap around. The minimum connection frame number CFN_min can be individually announced to the terminal in the message PCR or made accessible to all the terminals as a cell-specific value over the broadcast channel.

With the second measure the terminal, after changing cells, announces the connection frame number CFN determined by it. After the terminal has synchronized with the physical downlink signal and has then determined the connection frame number CFN in the new cell with the aid of the above formula, the RRC layer of the terminal sends a message PCRC (Physical Channel Reconfiguration Complete) to the radio network controller, by which message the terminal confirms the reconfiguration of the physical channel and which message contains a connection frame number CFN_first determined first. For the rules described hereinafter, according to which the hyperframe number HFN is incremented or not, it is important that the message PCRC to be sent by the RRC layer be sent at least one radio frame after the connection frame number CFN_first. This message can already be sent over the dedicated channel in the new cell which, however, then pre-supposes that the radio network controller has already synchronized with the uplink signal.

In the other case this message would be sent over the RACH channel in the new cell. After the synchronization with the physical uplink signal has been effected, the radio network controller also determines the connection frame number CFN for the new cell. Since both terminal and radio network controller utilize the same system frame number SFN for determining the connection frame number CFN, they are the same. It is, however, not yet clear and, more particularly, when the determined connection frame numbers CFN are small (for example 20, whereas 150 would be large in this respect) whether between the sending of the message PCRC and the final reception of this message in the radio network controller, the new connection frame number CFN has been estimated. This information is then announced in the co-sent connection frame number CFN_first. The following rules are then to be adhered to:

1. Let CFN_current be the connection frame number in the RRC layer of the radio network controller after reception and decoding of the message PCRC. The radio network controller does not increment the hyperframe number HFN after reception of the message PCRC, if the following holds:

$CFN\_current - CFN\_first > 0$

2. The radio network controller increments the hyperframe number HFN once after the reception of the message PCRC, if the following holds:

$CFN\_current - CFN\_first \leq 0.$

The incrementation in the case of CFN_current=CFN_first is necessary, because—as observed above—it is impossible for the message PCRC to be sent and received in the same radio frame, because the RRC layer in the terminal waits for at least one radio frame until it sends this message after it has been generated. Therefore, CFN_current=CFN_first can only mean that the radio frames denoted CFN_current or CFN_first, respectively, lie 256 radio frames apart.

The procedure described above may be further explained with reference to FIG. 5. Reference character 20 denotes an instant at which the terminal TE has synchronized with the physical downlink signal. Subsequently, the first connection frame number CFN_first (for example, CFN_first=221) is calculated by the terminal (reference character 21) and then sent to the radio network controller of the radio access network FZ (reference characters 22 and 23) by means of the message PCRC. After the message PCRC has been evaluated in the radio network controller, the current connection frame number CFN_current (reference character 24) is calculated and CFN_first and CFN_current are compared with each other.

This procedure and also the deactivation procedure can be used in the case of a change from state CELL_FACH to state CELL_DCH.

Since the connection frame number CFN has a cycle of 256, with this procedure the hyperframe number HFN can be kept synchronized for one terminal and for the radio network controller only if between determining CFN_first and CFN_current not more than 256 radio frames have elapsed. As a rule, this will be the case. However, it is conceivable that in highly unfavorable cases, as a result of frequent transmission repetitions, the transmission of the message PCRC requires 256 radio frames or more. If these cases are to be covered, in lieu of the connection frame number CFN for the formation of CFN_current and CFN_first, the generalized connection frame number CFN* must be used, which connection frame number CFN* arises from the system frame number SFN not by modulo-256 formation, but by modulo-M formation.

$CFN^* = ((SFN^* 38400 - DOFF^* 512) \operatorname{div} 38400) \bmod M,$ where M=256 L and L may adopt 2, 4, 8, 16. Then the following conditions hold:

$CFN^*\_current - CFN^*\_first > 0:$

There has not been a wrap around of the connection frame number CFN. Therefore, no incrementation of the hyperframe number HFN occurs.

$-256 < CFN^*\_current - CFN^*\_first \leq 0:$

There has been exactly one wrap around of the connection frame number CFN. Therefore, the hyperframe number HFN is incremented once.

$-512 < CFN^*\_current - CFN^*\_first \leq -256:$

There have been exactly two wrap arounds of the connection frame number CFN. Therefore, the hyperframe number HFN is incremented twice.

In general, there may be formulated:

$-256\,k < CFN^*\_current - CFN^*\_first \leq -256\,(k-1),$
  with $k=1, 2, \ldots, L:$ There have been exactly k wrap arounds of the connection frame number CFN. Therefore, the hyperframe number HFN is incremented k times.

These equations lead to the correct hyperframe number HFN in the radio network controller if it holds that $k \leq L$, i.e. that L is to be selected such that the generalized connection frame number CFN* can have one wrap around as a maximum.

The invention claimed is:

1. A wireless network comprising a radio access network and a plurality of terminals, which are each provided for encoding certain data to be transmitted and for forming in the same manner a key in dependence on a first and a second frame number for a connection to be set up or reconfigured between the radio access network and a terminal, in which the first frame number depends on the periodically changing number of the radio frame used for the data transmission and the value of the second frame number depends on the first frame number, and in which the terminal and/or the radio access network is provided for ascertaining, based on the value of the first frame number, whether a time delay in the formation of the second frame number is to take place in the radio access network, and whether an announcement for the formation of the second frame number is permitted to be sent to the radio access network.

2. A wireless network as claimed in claim 1, characterized in that the radio access network is provided for sending to the terminal a message containing the announcement about an activation instant for the formation of the second frame number.

3. A wireless network as claimed in claim 1, characterized in that the radio access network is provided for sending to the terminal a message with the announcement about a deactivation time space for the time delay of the formation of the second frame number.

4. A wireless network comprising a radio access network and a plurality of terminals which are each provided for encoding certain data to be transmitted and for forming in the same manner a key in dependence on a first and a second frame number for a connection to be set up or reconfigured between the radio access network and a terminal, in which the first frame number depends on the periodically changing number of the radio frame used for the data transmission and the value of the second frame number depends on the first frame number, and in which the terminal is provided for transmitting a frame number to the radio access network and for forming a second frame number dependent on the value of the first frame number, and determining whether an announcement for the formation of the second frame number is permitted to be sent to the radio access network.

5. A radio access network in a wireless network, which further comprises a plurality of terminals, in which the radio access network is provided for encoding certain data to be transmitted and for forming in the same manner a key in dependence on a first and a second frame number for a connection to be set up or to be reconfigured between the radio access network and a terminal, in which the first frame number depends on the periodically changing number of the radio frame used for the data transmission and the value of the second frame number depends on the first frame number, and in which the radio access network is provided for ascertaining, based on the value of the first frame number, whether a time delay in the formation of the second frame number is to take place in the radio access network, and whether an announcement for the formation of the second frame number is permitted to be sent to the radio access network.

6. A terminal in a wireless network comprising a radio access network and further terminals, which wireless network terminal is provided for encoding certain data to be transmitted and for forming in the same manner a key in dependence on a first and a second frame number for a connection to be set up or reconfigured to the radio access network terminal, in which the first frame number depends on the periodically changing number of the radio frame used for the data transmission and the value of the second frame number depends on the first frame number, and in which the terminal is provided for ascertaining, based on the value of the first frame number, whether a time delay in the formation of the second frame number is to take place in the radio access network.

* * * * *